(12) United States Patent
Sherlock et al.

(10) Patent No.: US 7,578,164 B2
(45) Date of Patent: Aug. 25, 2009

(54) METHOD AND APPARATUS FOR INSPECTING TURBINE NOZZLE SEGMENTS

(75) Inventors: Graham David Sherlock, Greenville, SC (US); Paul Lawrence Kalmar, Zirconia, NC (US); Benjamin Erick Baker, Pelzer, SC (US)

(73) Assignee: General Electric Company, Schenectady, NY (US)

( * ) Notice: Subject to any disclaimer, the term of this patent is extended or adjusted under 35 U.S.C. 154(b) by 760 days.

(21) Appl. No.: 11/232,625

(22) Filed: Sep. 22, 2005

(65) Prior Publication Data
US 2007/0231124 A1 Oct. 4, 2007

(51) Int. Cl.
*G01B 3/30* (2006.01)

(52) U.S. Cl. .................. 73/1.79; 73/865.8; 33/549; 415/118

(58) Field of Classification Search ............. 73/1.75, 73/1.78; 415/118; 33/548, 549
See application file for complete search history.

(56) References Cited

U.S. PATENT DOCUMENTS

| | | | |
|---|---|---|---|
| 3,757,424 A | 9/1973 | Palmenberg | |
| 4,222,172 A | 9/1980 | Mason | |
| 4,327,495 A | 5/1982 | Plante | |
| 4,391,565 A | 7/1983 | Speak | |
| 4,509,265 A * | 4/1985 | Donaldson | .......... 33/549 |
| 4,883,405 A | 11/1989 | Walker | |
| 5,174,715 A | 12/1992 | Martin | |
| 5,249,920 A | 10/1993 | Shepherd et al. | |
| 5,343,694 A | 9/1994 | Toborg et al. | |
| 5,554,001 A | 9/1996 | Boyd et al. | |
| 5,591,003 A | 1/1997 | Boyd et al. | |
| 6,416,278 B1 | 7/2002 | Caddell, Jr. et al. | |
| 6,450,762 B1 | 9/2002 | Munshi | |
| 6,842,995 B2 * | 1/2005 | Jones et al. | .......... 33/645 |
| 6,886,422 B2 | 5/2005 | King et al. | |
| 7,017,431 B2 | 3/2006 | King et al. | |
| 7,178,255 B1 * | 2/2007 | Roesel et al. | .......... 33/645 |
| 7,231,724 B2 * | 6/2007 | Sherlock et al. | .......... 33/542 |
| 2002/0193897 A1 | 12/2002 | Burdgick | |

OTHER PUBLICATIONS

EP Search Report, App. No. 06254888.8 (Jan. 9, 2007).

* cited by examiner

*Primary Examiner*—Hezron Williams
*Assistant Examiner*—Mark Shabman
(74) *Attorney, Agent, or Firm*—Armstrong Teasdale LLP (57) ABSTRACT

A method for inspecting a turbine nozzle segment includes positioning the turbine nozzle segment on a base of a tool, with the outer forward face and the inner forward face of the turbine nozzle segment contacting a surface of the base. The outer wall is positioned between a first pedestal outer stand and a second pedestal outer stand of the tool, and the inner wall is positioned between a first pedestal inner stand and a second pedestal inner stand of the tool. At least one of a position, a depth and a width of a seal slot formed in a side edge of the outer wall and/or the inner wall is measured. At least one axial dimension of the turbine nozzle segment and at least one radial dimension of the turbine nozzle segment are measured.

9 Claims, 6 Drawing Sheets

METHOD AND APPARATUS FOR INSPECTING TURBINE NOZZLE SEGMENTS

BACKGROUND OF THE INVENTION

This invention relates generally to turbines and, more particularly, to turbine nozzles.

Turbine nozzles are formed or configured of nozzle segments that are connected together circumferentially about an axis of a turbine engine. Each nozzle segment includes a seal slot formed at opposing side edges of the nozzle segment. A suitable seal or gasket is positioned within the seal slots of adjacent nozzle segments to form a seal to prevent or limit gas or steam from escaping the turbine engine at undesirable locations, such as between adjacent turbine nozzle segments and/or adjacent turbine nozzles. In order to maintain a proper seal, a depth and/or a width of each seal slot must be maintained within or conform to an accepted tolerance with respect to a desired engineering specification and/or dimension. Further, machined axial dimensions and/or machined radial dimensions should be inspected to ensure that such dimensions are within acceptable tolerances for the respective turbine nozzle segment. Periodic inspection of the nozzle segments, including measuring the dimensions of each seal slot, as well as the axial dimensions and/or radial dimensions of other machined features of the nozzle segment, is required to maintain proper functioning of the turbine, without performance loss.

Conventional tools and methods for measuring machined features of a turbine nozzle segment have proved to be unreliable. Frequently, inspected and/or repaired nozzles are fully assembled before it is possible to determine whether the nozzle segments are properly aligned, connected and/or sealed. Non-conforming nozzles, if installed in a turbine, may result in a subsequent performance loss of up to about 5%. Conventional tools and methods do not provide a reliable method for ensuring that individual nozzle segments conform to engineering specifications and/or dimensions.

BRIEF DESCRIPTION OF THE INVENTION

In one embodiment, a method for inspecting a turbine nozzle segment is provided. The turbine nozzle segment includes an outer wall having an axial length extending between an outer forward face and an outer aft face, and an opposing inner wall having an axial length extending between an inner forward face and an inner aft face, a leading edge defined between the outer forward face and the inner forward face and a trailing edge defined between the outer aft face and the inner aft face. The turbine nozzle segment is positioned on a base of a tool, with the outer forward face and the inner forward face contacting a surface of the base. The outer wall is positioned between a first pedestal outer stand and a second pedestal outer stand of the tool. The inner wall is positioned between a first pedestal inner stand and a second pedestal inner stand of the tool.

At least one of a position, a depth and a width of at least one seal slot formed in each of a first side edge and a second side edge of the outer wall, and extending at least partially along the axial length of the outer wall, is measured. At least one of a position, a depth and a width of at least one seal slot formed in each of a first side edge and a second side edge of the inner wall, and extending at least partially along the axial length of the inner wall, is measured. Further, at least one axial dimension of the turbine nozzle segment and at least one radial dimension of the turbine nozzle segment is measured.

In one embodiment, a tool for inspecting a turbine nozzle segment is provided. The tool includes a base having an outer rail that corresponds to an outer surface of the turbine nozzle segment outer wall. The outer rail is concentric with an axis of a turbine engine shaft. The base also includes an inner rail parallel with an inner surface of the turbine nozzle segment inner wall. A first pedestal is connected to the base and includes an outer stand and a cooperating inner stand. The outer stand and the inner stand each includes at least one plate. A first side edge of the turbine nozzle segment is positioned with respect to each of the outer stand and the inner stand. A second pedestal is connected to the base and includes an outer stand and a cooperating inner stand. The outer stand and the inner stand each includes at least one plate. An opposing second side edge of the turbine nozzle segment is positioned with respect to each of the outer stand and the inner stand. The outer wall is positioned between the outer stand of the first pedestal and the outer stand of the second pedestal. The inner wall is positioned between the inner stand of the first pedestal and the inner stand of the second pedestal.

In one embodiment, a system for inspecting a turbine nozzle segment is provided. The system includes a tool with a base having an outer rail corresponding to an outer surface of the turbine nozzle segment outer wall. The outer rail is concentric with an axis of a turbine engine shaft. The base includes an inner rail parallel with an inner surface of the turbine nozzle segment inner wall. A first pedestal is connected to the base. The first pedestal includes an outer stand and an inner stand each including a plate forming a plurality of voids. A second pedestal is connected to the base and includes an outer stand and an inner stand, each including a plate forming a plurality of voids. Each pin of a plurality of pins is positionable within a corresponding void formed in at least one of the plates. The pin cooperates with the corresponding void to measure a position, a depth and/or a width of at least a portion of a seal slot formed in the first side edge or the second side edge of the turbine nozzle segment. The system also includes a setting plate connected to the first pedestal and corresponding to a cross-sectional profile of at least a portion of the turbine nozzle segment.

DETAILED DESCRIPTION OF THE INVENTION

The present invention is directed to method, apparatus and system for inspecting a turbine nozzle segment, including measuring axial, radial and/or circumferential dimensions and/or distances with respect to other components included in a turbine nozzle, a turbine engine and/or a turbine. For example, the method, apparatus and/or system of the present invention may be used to measure dimensions of machined features of a turbine nozzle segment, such as a seal slot, to ensure that the size, configuration and/or shape of the segment elements, components and/or features conform to engineering specifications and dimensions.

Although the following description is directed to inspecting and measuring dimensions of machined features of a turbine nozzle segment, it is apparent to those skilled in the art that the method, apparatus and/or system of the present invention may be used to measure dimensions of any compatible turbine part, element or component or any machined part, element or component. Therefore, the turbine nozzle segment as described and illustrated herein is for illustrative purposes only and is not intended to limit the described method, apparatus and system in any aspect.

Figure 1:
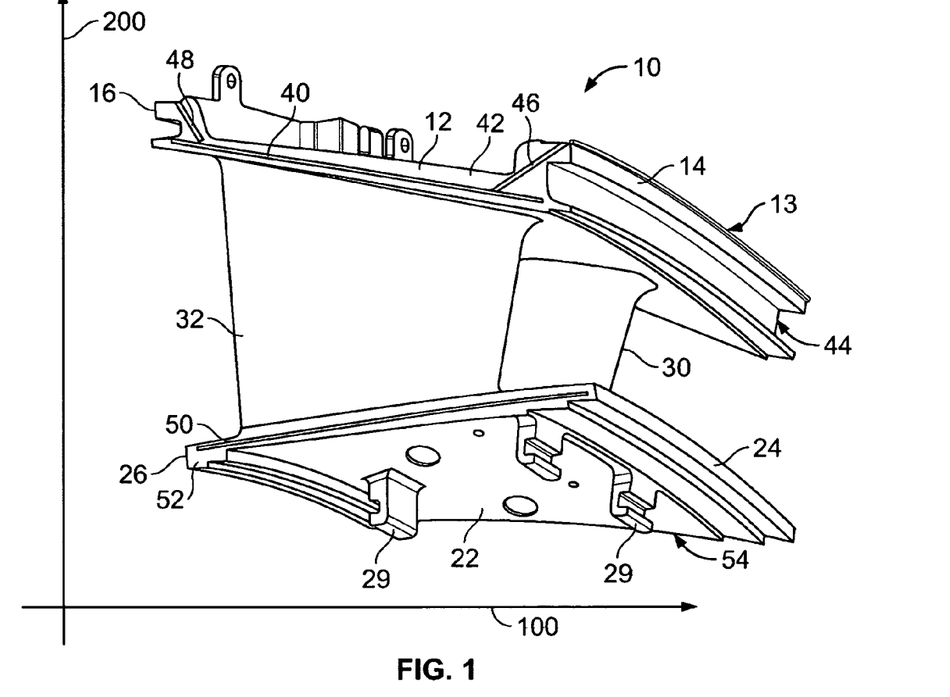
FIG. 1 is a perspective view of an exemplary turbine nozzle segment.
Figure 2:
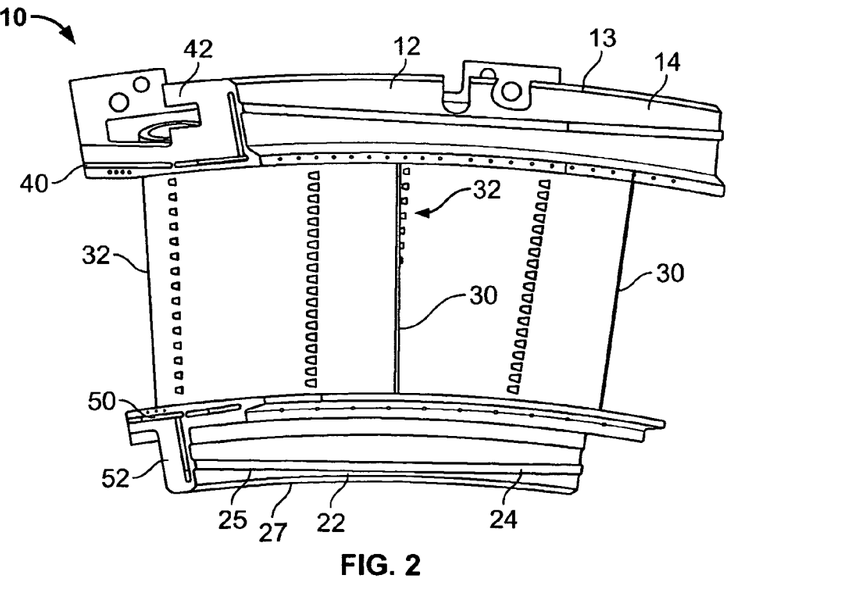
FIG. 2 is a front view of an exemplary turbine nozzle segment.

FIG. 1 is a perspective view of a turbine nozzle segment 10. As used herein, references to an "axial dimension," "axial direction" or an "axial length" are to be understood to refer to a measurement, distance or length, for example of a nozzle part or component, which extends along or is parallel to axis 100. Further, references herein to a "radial dimension," "radial direction" or a "radial length" are to be understood to refer to a measurement, distance or length, for example of a nozzle part or component, that extends along or is parallel to an axis 200, which intersects axis 100 at a point on axis 100 and is perpendicular thereto. Additionally, references herein to a "circumferential dimension," "circumferential direction" or a "circumferential length" are to be understood to refer to a measurement, distance or length, for example of a nozzle part or component, measured in a plane including axis 100 and axis 200 or in a plane parallel with such plane.

Referring to FIG. 1, exemplary nozzle segment 10 is connectable with adjacent nozzle segments 10 to form a nozzle for a turbine engine. Any suitable number of nozzle segments 10, such as eighteen nozzle segments 10, may be circumferentially positioned within a turbine housing or shell and connected to form a turbine nozzle about a turbine shaft, and generally extending in an axial direction along axis 100. The turbine engine may include any suitable number of turbine nozzles. During operation of the turbine engine, hot gas is directed through the nozzles to impact blades causing the blades to rotate about the turbine shaft having a length that generally extends along axis 100.

Referring further to FIGS. 1-4, nozzle segment 10 includes an outer wall 12 having an axial length extending between an outer forward face 14 and an outer aft face 16. An inner wall 22 generally opposes outer wall 12 and has an axial length that extends between an inner forward face 24 and an inner aft face 26. A leading edge 30 of nozzle segment 10 is defined between outer forward face 14 and inner forward face 24 and a trailing edge 32 of nozzle segment 10 is defined between outer aft face 16 and inner aft face 26. In one embodiment, a radial length of trailing edge 32 is greater than a radial length of leading edge 30. Nozzle segment 10 may include at least one seal slot 40 formed in outer wall 12 and/or at least one seal slot 50 formed in inner wall 22. A suitable seal or gasket (not shown) is insertable into seal slot 40 and/or 50 to form a fluid-proof seal between adjacent nozzle segments 10 and/or adjacent turbine nozzles, when nozzle segment 10 is positioned within the turbine housing or shell to form the turbine nozzle.

For example, referring to FIG. 1, a seal slot 40 may be formed in a first side edge 42 and/or an opposing second side edge 44 of outer wall 12. In one embodiment, seal slot 40 is formed in or by outer wall 12 and extends substantially along an axial length of outer side edge 42 and/or opposing outer side edge 44. Seal slot 40 may include additional slot portions 46, 48 that extend from seal slot 40 partially into outer forward face 14 and/or outer aft face 16. Similarly, a seal slot 50 may be formed in a first side edge 52 and/or an opposing second side edge 54 of inner wall 22. Seal slot 50 is formed in or by inner wall 22 and extends substantially along an axial length of inner side edge 52 and/or opposing inner side edge 54. Although not shown, seal slot 50 may include additional slot portions that extend from seal slot 50 partially into inner forward face 24 and/or inner aft face 26.

Seal slot 40 including seal slot portions 46, 48, and/or seal slot 50 are formed in respective outer side edges 42, 44 and inner side edges 52, 54 using any suitable forming process known to those skilled in the art, such as a suitable laser cutting, grinding and/or welding process. Seal slot 40 and/or seal slot 50 are formed in nozzle segment 10 to precise engineering specifications or dimensions, having a workable tolerance suitably within about +/−0.030 inch, desirably within about +/−0.020 inch, and more desirably within about +/−0.005 inch. Such tolerances prevent or minimize leakage between adjacent nozzle segments 10 at or through seals 40 and/or 50, for example. The present invention provides a method, apparatus and system for inspecting and measuring machined features of nozzle segment 10 to ensure that the machined feature measurements and/or dimensions conform to the engineering measurements and/or dimensions.

In one embodiment, a tool 110 for inspecting and measuring dimensions of nozzle segment 10, including measurements and/or dimensions of a machined feature of nozzle segment 10, is provided, as shown in FIGS. 5-10.

Figure 5:
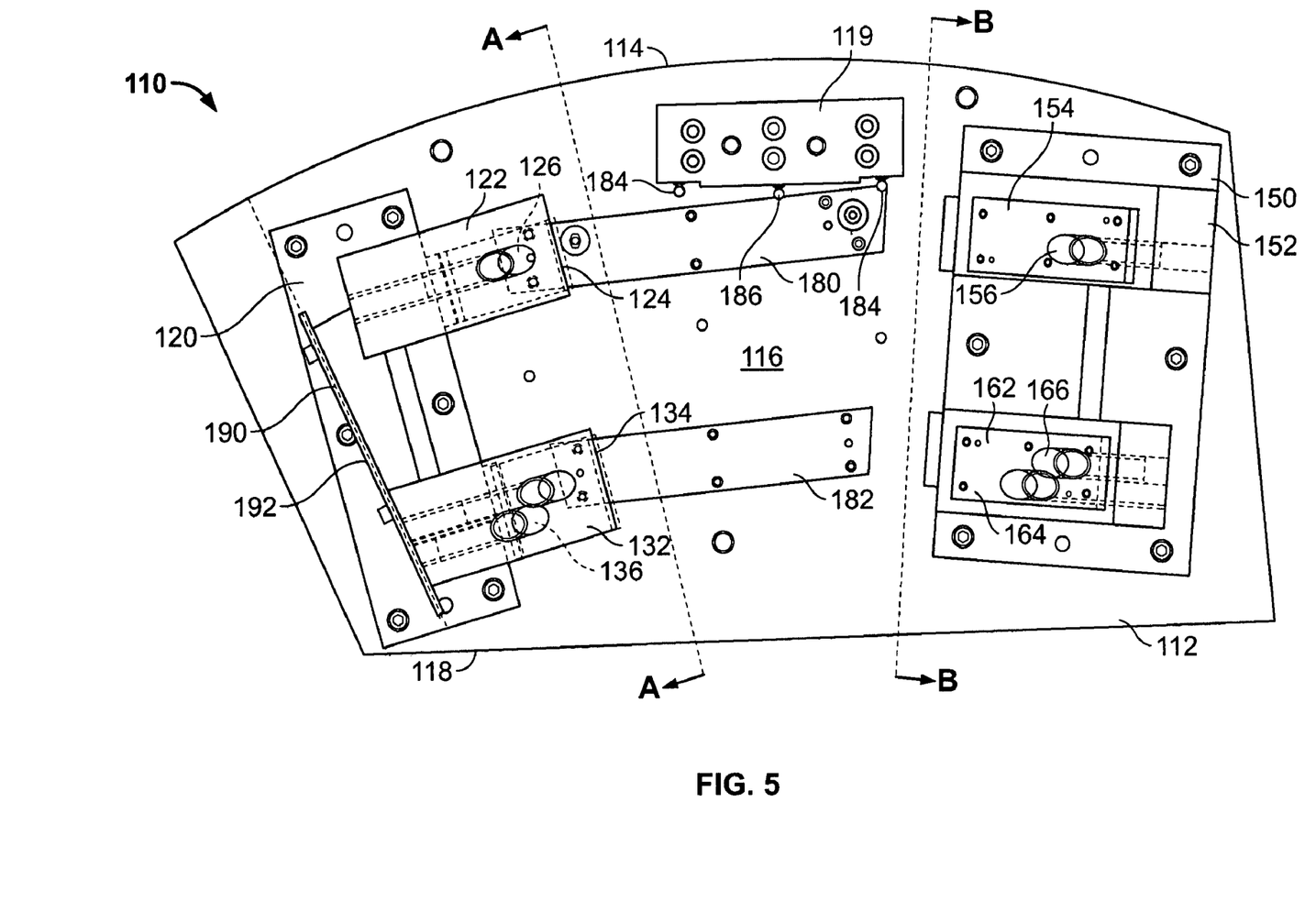
FIG. 5 is a top view of a tool for inspecting a turbine nozzle segment, according to one embodiment of this invention.

Tool 110 includes a support or base 112 having an outer rail 114 corresponding to a surface of a nozzle segment outer wall 12. For example, nozzle segment 10 may be positioned on base 112 with an outer surface 13 of outer wall 12 correspondingly positioned with respect to outer rail 114. In one embodiment, outer rail 114 is aligned or positioned concentrically with turbine axis 100. With nozzle segment 10 positioned on base 112, leading edge 30 is positioned at a surface 116 of base 112 such that at least a portion of outer forward face 14 and/or at least a portion of inner forward face 24 contact surface 116. Base 112 also includes a generally opposing inner rail 118 parallel with a surface of inner wall 22, such as a surface of a chordal hinge or wall 25. With nozzle segment 10 positioned on base 112, as discussed above, an inner surface 27 of chordal hinge 25 is aligned or positioned substantially parallel with inner rail 118. In an alternative embodiment, tool 112 also includes a third rail, not shown, that is generally parallel to an outer chordal hinge of nozzle segment 10.

Tool 110 includes a first pedestal 120 and a cooperating second pedestal 150 each mounted or connected to base 112. For example, first pedestal 120 and second pedestal 150 can be mounted or connected to base surface 116 using any suitable fasteners or connectors, such as bolts, and/or any suitable welding process. It is apparent to those skilled in the art and guided by the teachings herein provided, that any suitable mounting or connecting process can be used to secure first pedestal 120 and/or second pedestal 150 to base surface 116.

First pedestal 120 includes an outer stand 122 and an inner stand 132. Inner stand 132 is aligned with respect to and cooperates with outer stand 122 to properly positioned nozzle segment 10 on base 116. Specifically, outer stand 122 and inner stand 132 maintain first side edges 42, 52 properly positioned within tool 110 such that first side edge 42 is aligned with outer stand 122 and first side edge 52 is aligned with inner stand 132.

Figure 6:
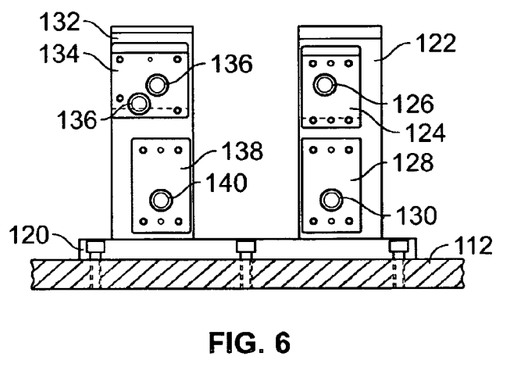
FIG. 6 is a cross-sectional view of the tool shown in FIG. 5, along sectional line A-A.
Figure 7:
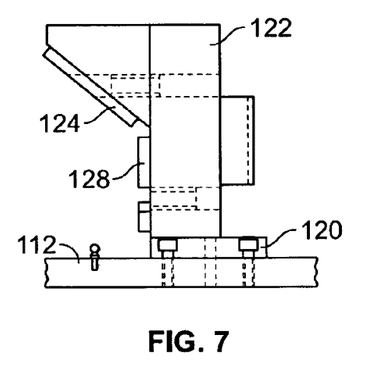
FIG. 7 is a partial side view of the tool shown in FIG. 5.

As shown in FIGS. 6 and 7, outer stand 122 includes an upper plate 124 mounted or connected to an upper portion of outer stand 122. In one embodiment, upper plate 124 includes at least one void 126 formed through upper plate 124 and extending at least partially into outer stand 122. Each void 126 is positioned to correspond with a machined feature of nozzle segment 10, as described below. Each void 126 has a suitable size and/or diameter for properly measuring the corresponding machined feature of nozzle segment 10.

Outer stand 122 also includes a lower plate 128 mounted or connected to a lower portion of outer stand 122, as shown in FIGS. 5-7. In one embodiment, lower plate 128 includes at least one void 130 formed through lower plate 128 and extending at least partially into outer stand 122. Each void 130 is positioned to correspond with a machined feature of nozzle segment 10. Each void 130 has a suitable size and/or diameter for properly measuring the corresponding machined feature of nozzle segment 10. In one embodiment, upper plate 124 forms void 126 and lower plate 128 forms void 130 that cooperate with a series of measuring pins to measure a position, a depth and/or a width of at least a portion of seal slot 40 formed in side edge 42. A bushing or other suitable liner is positionable within void 126, 130 to accept and maintain a measuring pin properly positioned within void 126, 130 to measure at least a portion of seal slot 40.

As shown in FIGS. 6 and 7, inner stand 132 includes an upper plate 134 mounted or connected to an upper portion of inner stand 132. In one embodiment, upper plate 134 includes at least one void 136 formed through upper plate 134 and extending at least partially into inner stand 132. Each void 136 is positioned to correspond with a machined feature of nozzle segment 10. Each void 136 has a suitable size and/or diameter for properly measuring the corresponding machined feature of nozzle segment 10.

Inner stand 132 also includes a lower plate 138 mounted or connected to a lower portion of inner stand 132, as shown in FIGS. 6 and 7. In one embodiment, lower plate 138 forms or includes at least one void 140 formed through lower plate 138 and extending at least partially into inner stand 132. Each void 140 is positioned to correspond with a machined feature of nozzle segment 10. Each void 140 has a suitable size and/or diameter for properly measuring the corresponding machined feature of nozzle segment 10. In one embodiment, upper plate 134 forms at least one void 136 and lower plate 138 forms void 140 that cooperate with a series of pins to measure a position, a depth and/or a width of at least a portion of seal slot 50 formed in side edge 52 of nozzle segment 10. A bushing or other suitable liner is positionable within void 136, 140 to accept and maintain a measuring pin properly positioned within void 136, 140 to measure at least a portion of seal slot 50.

As shown in FIG. 5, second pedestal 150 includes an outer stand 152 and an inner stand 162. Inner stand 162 is aligned with respect to and cooperates with outer stand 152, in combination with outer stand 122 and inner stand 132, to properly positioned nozzle segment 10 on base 116. Specifically, outer stand 152 and inner stand 162 maintain second side edges 44, 54 properly positioned within tool 112 such that second side edge 44 is aligned with outer stand 152 and second side edge 54 is aligned with inner stand 162.

Figure 8:
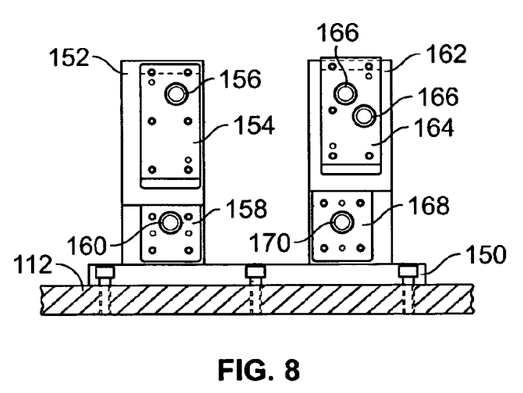
FIG. 8 is a cross-sectional view of the tool shown in FIG. 5, along sectional line B-B.
Figure 9:
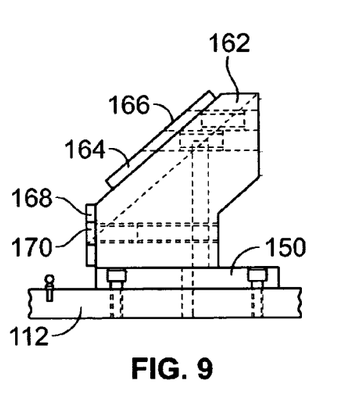
FIG. 9 is a partial side view of the tool shown in FIG. 5.

As shown in FIGS. 8 and 9, outer stand 152 includes an upper plate 154 mounted or connected to an upper portion of outer stand 152. In one embodiment, upper plate 154 includes at least one void 156 formed through upper plate 154 and extending at least partially into outer stand 152. Each void 156 is positioned to correspond with a machined feature of nozzle segment 10, and has a suitable size and/or diameter for properly measuring the corresponding machined feature of nozzle segment 10. A bushing or other suitable liner is positionable within void 156 to accept and maintain a measuring pin properly positioned within void 156 to measure at least a portion of seal slot 40.

Outer stand 152 also includes a lower plate 158 mounted or connected to a lower portion of outer stand 152, as shown in FIG. 8. In one embodiment, lower plate 158 includes at least one void 160 formed through lower plate 158 and extending at least partially into outer stand 152. Each void 160 is positioned to correspond with a machined feature of nozzle segment 10, and has a suitable size and/or diameter for properly measuring the corresponding machined feature of nozzle segment 10. A bushing or other suitable liner is positionable within void 160 to accept and maintain a measuring pin properly positioned within void 160 to measure at least a portion of seal slot 40.

As shown in FIGS. 8 and 9, inner stand 162 includes an upper plate 164 mounted or connected to an upper portion of inner stand 162. In one embodiment, upper plate 164 includes at least one void 166 formed through upper plate 164 and extending at least partially into inner stand 162. Each void 166 is positioned to correspond with a machined feature of nozzle segment 10, and has a suitable size and/or diameter for properly measuring the corresponding machined feature of nozzle segment 10. A bushing or other suitable liner is positionable within void 166 to accept and maintain a measuring pin properly positioned within void 166 to measure at least a portion of a seal slot 50.

Inner stand 162 also includes a lower plate 168 mounted or connected to a lower portion of inner stand 162, as shown in FIGS. 8 and 9. In one embodiment, lower plate 168 includes at least one void 170 formed through lower plate 168 and extending at least partially into inner stand 162. Each void 170 is positioned to correspond with a machined feature of nozzle segment 10, and has a suitable size and/or diameter for properly measuring the corresponding machined feature of nozzle segment 10. A bushing or other suitable liner is positionable within void 170 to accept and maintain a measuring pin properly positioned within void 170 to measure at least a portion of seal slot 50.

Referring to FIGS. 5-9, in one embodiment, nozzle segment 10 is positioned within tool 112 such that outer wall 12 is positioned between outer stand 122 of first pedestal 120 and outer stand 152 of second pedestal 150, and inner wall 22 is positioned between inner stand 132 of first pedestal 120 and inner stand 162 of second pedestal 150. In this embodiment, tool 112 may further include at least one axial locator that interferes with and/or guides outer wall 12 and/or inner wall 22 to position nozzle segment 10 in an axial direction with respect to base 112. For example, in one embodiment, tool 112 includes an outer axial locator 180 and/or an inner axial locator 182, as shown in FIG. 5, which contacts and interferes with respective outer wall 12 or inner wall 14 to properly position nozzle segment 10 in an axial position with respect to base 112. Additionally, or alternatively, tool 110 may include at least one tooling ball 184 rotatably mounted or connected to a block 119 secured to base 112. Tooling ball 184 positions nozzle segment 10 in a proper radial direction with respect to base 112. As shown in FIG. 5, an anti-rotational ball 186 may also be rotatably mounted or connected to block 119 to prevent or limit rotational movement of nozzle segment 10 with respect to base 112.

Figure 3:
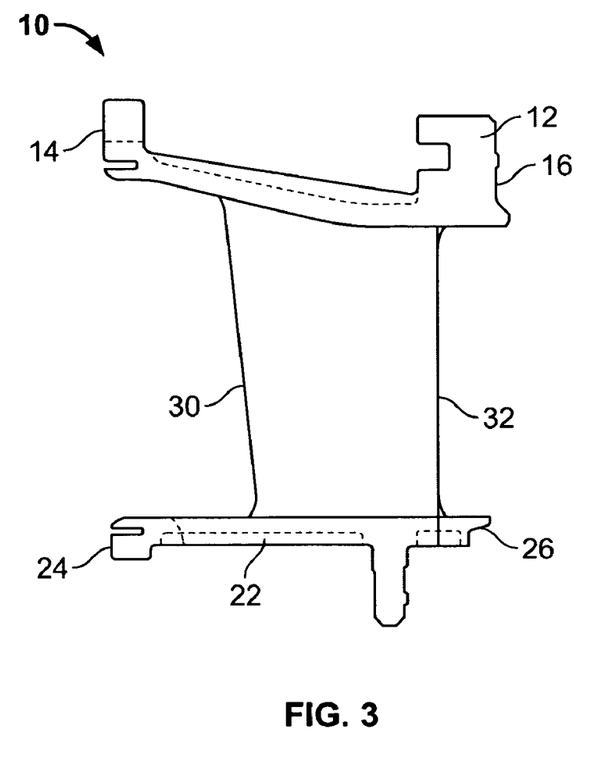
FIG. 3 is a side view of the turbine nozzle segment shown in FIG. 2.
Figure 4:
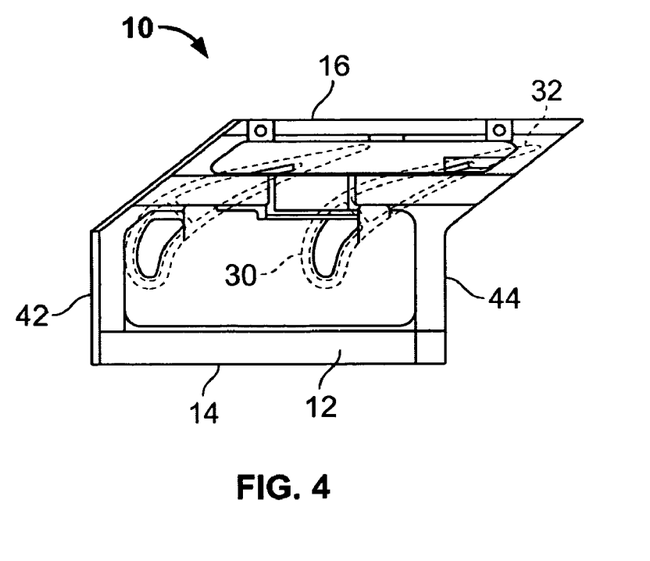
FIG. 4 is a side view of an exemplary turbine nozzle segment.
Figure 10:
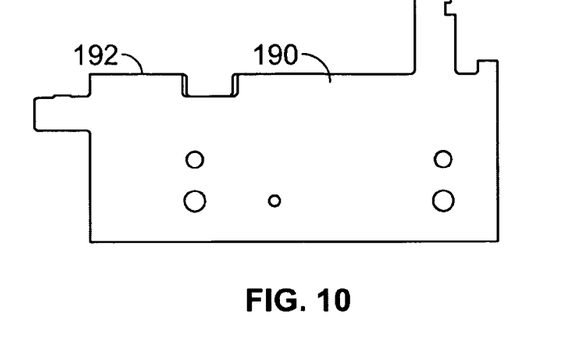
FIG. 10 is a front view of a setting plate, according to one embodiment of this invention.

In one embodiment, tool 110 includes a setting plate 190 mounted or connected to first pedestal 120. Referring further to FIGS. 3 and 10, setting plate 190 has a profile or peripheral edge 192 that corresponds directly to measurements and/or element or feature dimensions at a side profile or a cross-sectional profile of at least a portion of nozzle segment 10. As discussed in greater detail below, a dimension or measurement of a nozzle segment feature can be compared with an engineering specification or dimension of the feature using a suitable measuring instrument, such as a dial gauge. For example, the dial gauge is used to measure a nominal radial measurement of a point on chordal hinge 25 of nozzle segment 10 from setting plate 190, and the nominal radial measurement is recorded. The dial gauge is used to measure a corresponding point on chordal hinge 25 of nozzle segment 10 positioned within tool 10. The measurement can be compared to the nominal measurement to determine whether the measurement is within an accepted tolerance.

In one embodiment, tool 110 is utilized to measure selected feature dimensions of nozzle segment 10. It is apparent to those skilled in the art and guided by the teachings herein provided that tool 110 can be utilized to measure any feature of nozzle segment 10, although not discussed herein. Nozzle segment 10 is positioned on base 112 of tool 110 with outer forward face 14 and inner forward face 24 contacting surface 116 of base 112. Outer wall 12 is positioned between outer stand 122 and outer stand 152 and inner wall 24 is positioned between inner stand 132 and inner stand 162.

With nozzle segment 10 properly positioned in tool 110, a position, a depth and/or a width of at least one seal slot 40 formed in first side edge 42 and/or second side edge 44 of outer wall 12 can be measured. Similarly, a position, a depth and/or a width of at least one seal slot 50 formed in first side edge 52 and/or second side edge 54 of inner wall 22 can be measured. Referring further to FIGS. 11-14, suitable measuring pins 196 are available to measure the position, depth and/or width of seal slot 40, which extends at least partially along the axial length of outer wall 12. Each measuring pin 196 has a base portion 197 having a selected diameter for insertion into a corresponding or marked void 126 formed in upper plate 124 or a corresponding or marked void 130 formed in lower plate 128 of outer stand 122, for example.

Figure 11:
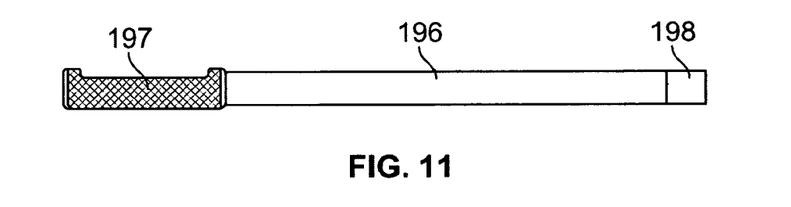
FIG. 11 is a side view of a measuring pin, according to one embodiment of this invention.
Figure 12:
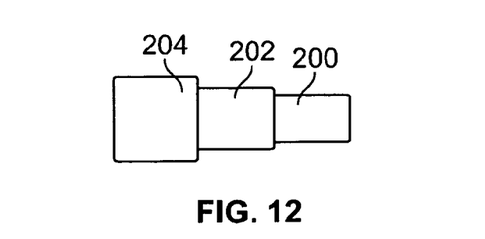
FIG. 12 is an exploded view of a tip portion of the measuring pin shown in FIG. 11.
Figure 13:
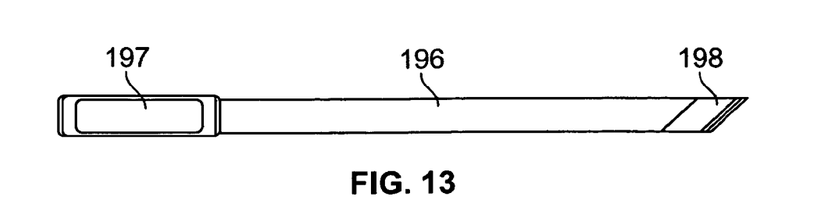
FIG. 13 is a side view of a measuring pin, according to one embodiment of this invention.
Figure 14:
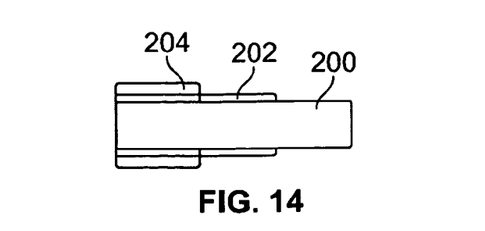
FIG. 14 is an exploded view of a tip portion of the measuring pin shown in FIG. 13.

Measuring pin 196 also includes a tip portion 198 opposing base portion 197. Tip portion 198 includes measuring positions or sections that measure the position, depth and/or width of at least a portion of seal slot 40 and/or seal slot 50, when tip portion 198 is inserted into seal slot 40 and/or seal slot 50. Tip portion 198 may have a generally rectangular cross-section, as shown in FIG. 11, to measure generally vertical seal slot portions of seal slot 40 and/or seal slot 50, or may have a suitable polygonal cross-section, such as a general parallelogram cross-section as shown in FIG. 13, to measure generally angled or diagonal seal slot portions of seal slot 40 and/or seal slot 50. For example, measuring pin 196 having a rectangular tip portion 198 can be inserted into a portion of seal slot 40 formed in a forward section of side edge 42, and a measuring pin 196 having an angled tip portion 198 can be inserted into a portion of seal slot 40 formed in an aft section of side edge 42. As tip portion 198 is inserted into seal slot 40, one of measuring positions 200, 202, 204, as shown in FIGS. 12 and 14, interfere with a side edge or wall of seal slot 40. The measuring position that interferes with the side edge or wall corresponds to the depth and/or width of seal slot 40.

In one embodiment, measuring position 200 corresponds to a drawing or engineering tolerance of about +/−0.005 inch; measuring position 202 corresponds to an acceptable limit without reworking the seal slot or the wall forming the seal slot, of about +/−0.020 inch; and measuring position 204 corresponds to an acceptable limit, with rework, of about +/−0.030 inch. Thus, a seal slot that is out of position by about 0.020 inch to about 0.030 inch should be recut and/or reformed without welding the seal slot closed. However, a seal slot that is at least about 0.030 inch out of position is not acceptable and will cause nozzle segment 10 to undesirably lock with an adjacent nozzle segment 10 during nozzle assembly. Seal slots that are out of position may be due to wall distortion, and can be properly positioned by hydraulically pressing the wall back into proper position. In rare cases, however, it may be necessary to weld the seal slot closed and recut a new seal slot to drawing specifications and dimensions.

Figure 15:
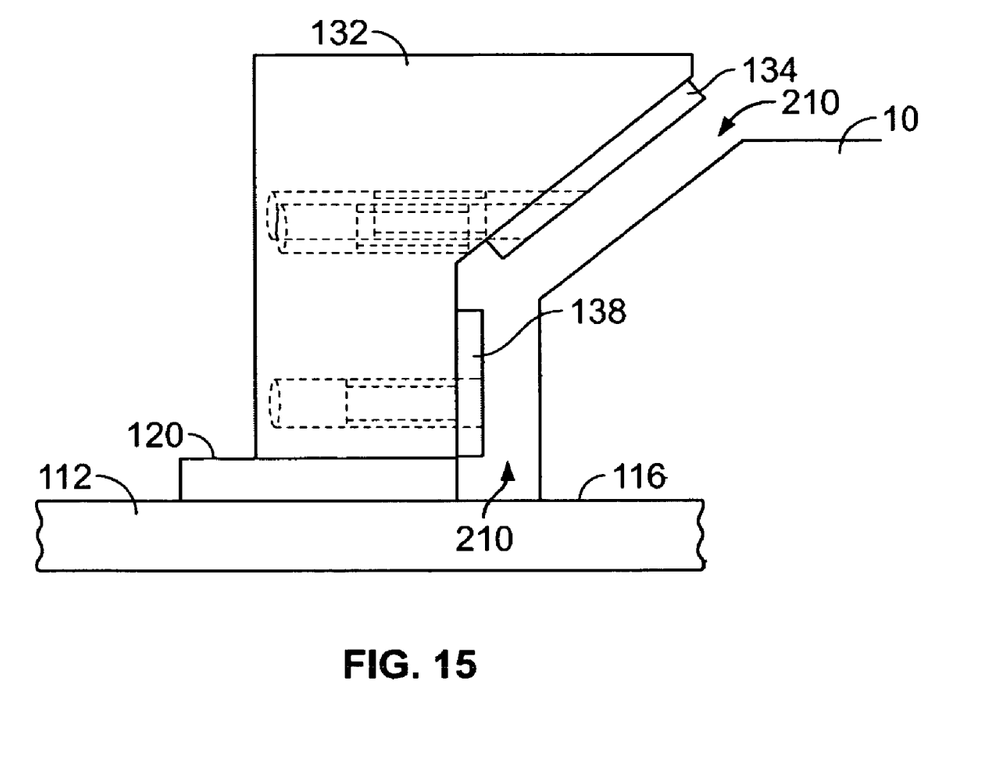
FIG. 15 is a side view of a portion of a turbine nozzle segment positioned on a tool base, according to one embodiment of this invention.

Referring to FIG. 15, a distance or gap 210 between a plate surface of a pedestal stand and a corresponding side edge of outer wall 12 or inner wall 14 can be measured, with nozzle segment 10 properly positioned on tool 110. For example, a distance between upper plate 124 and an angled aft section or portion of side edge 42 and/or a distance between lower plate 128 and a generally vertical forward section or portion of side edge 42 can be measured using any suitable measuring instrument known to those skilled in the art, such as a parallel slide. Similarly, distances between the aft section and the forward section of side edge 44 of outer wall 12 and upper plate 154 and lower plate 158 of stand 152, respectively, can be measured by positioning the parallel slide within a gap between side edge 44 and upper plate 154 or side edge 44 and lower plate 158. Further, distances between side edges 52, 54 and corresponding upper and lower plates of stands 132, 162 can be measured, resulting in a total of eight measurements including a forward section measurement and an aft section measurement for each side edge 42, 44, 52, 54. These measurements are compared to a nominal measurement of gap 210 of about 2.00 inches to determine whether these measurements are within the tolerances set forth in the Repair Engineering Instruction ("REI") for the measured nozzle segment.

In one embodiment, tool 110 is utilized to measure at least one axial dimension of nozzle segment 10. For example, with nozzle segment 10 positioned within tool 110, the following axial measurements, without limitation, can be taken: a distance between a hook 29 and base surface 116 corresponding to an axial length of hook 29; a distance between chordal hinge 25 and base surface 116 corresponding to an axial length of chordal hinge 25; and/or a distance between an aft face, namely outer aft face 16 or inner aft face 26, and base surface 116.

In one embodiment, the features of nozzle segment 10 are machined out of setting plate 190 along periphery 192. An axial dimension of a selected machined feature is measured on or along outer periphery 192 of setting plate 190 using a dial gauge and recorded as a nominal measurement. The dial gauge is used to measure an axial dimension of a corresponding machined feature of nozzle segment 10 positioned within tool 110. The measured axial dimension of the nozzle segment feature is compared to the nominal measurement to determine whether the axial dimension is within the acceptable tolerance. If the feature measurement is not within the acceptable tolerance, the feature should be reshaped and/or remachined. Such reshaping or remachining may require welding or bronzing and/or recutting the feature to conform to an acceptable engineering specification and/or dimension. Other suitable measuring instruments known those skilled in the art and guided by the teaching herein provided can be used to make these measurements.

In one embodiment, tool 110 is utilized to measure at least one radial dimension of nozzle segment 10. For example, with nozzle segment 10 positioned within tool 110, the following radial measurements, without limitation, can be taken: a radial distance between a point on chordal hinge 25 and inner rail 118 of base 112 corresponding to a radial position of chordal hinge 25 with respect to axis 100; and/or a radial distance between a point on hook 29 and inner rail 118 corresponding to a radius of hook 29.

In one embodiment, a radial dimension or distance of a selected machined feature is measured on or along outer periphery 192 of setting plate 190 using a dial gauge, such as a needle or finger type dial gauge mounted to a stand. The radial dimension or radial distance is measured and recorded as a nominal measurement. The stand is pressed firmly against outer rail 114 or inner rail 118 and movable or translatable along a length thereof, depending upon the measurement to be taken. For example, with the stand pressed firmly against inner rail 118, the stand is moved along the length of inner rail 118 to measure a radial position of chordal hinge 25 with respect to axis 100. Similarly, the stand can be positioned against inner rail 118 or outer rail 114 to measure a radius of a hook 29. A nominal measurement for the hook radius is measured on setting plate 190 and recorded. The stand is then positioned against inner rail 118 with the dial gauge needle contacting a surface of the hook. The stand is moved along inner rail 118 with the needle contacting the hook surface to measure a radial dimension or length of hook 29. The measured radial dimension of the nozzle segment feature is compared to the corresponding nominal measurement measured from setting plate 190 to determine whether the radial dimension is within the acceptable tolerance. If the feature measurement is not within the acceptable tolerance, the feature should be reshaped and/or remachined, as described above.

In one embodiment, tool 110 is utilized to measure a circumferential length of an element or feature of nozzle segment 10. For example, a circumferential length of outer forward face 14 is measured by sweeping a dial gauge along outer forward face 14 with the stand moving against outer rail 114. A distance between an outer surface of outer forward face 14 and outer rail 114 along a length of outer forward face 14 is measured. Similarly, a circumferential length of outer aft face 16 can be measured.

In one embodiment, a system for inspecting a turbine nozzle segment includes tool 110, as described above. The system further includes a plurality of measuring pins 196. Each measuring pin 196 has a plurality of measuring section or positions. In one embodiment, each measuring pin 196 includes a first measuring section 200 having a 0.005 inch tolerance, a second measuring section 202 having a 0.020 inch tolerance, and a third measuring section 204 having a 0.030 inch tolerance. Each measuring pin 196 includes base portion 197 positionable within a corresponding void formed in a plate. Tip portion 198 is positioned within at least a portion of a corresponding seal slot 40, 50 to measure a position, a depth and/or a width of at least a portion of a seal slot 40, 50, formed in a side edge of nozzle segment 10. The system also include setting plate 190 connected to first pedestal 120 and having outer periphery 192 corresponding to a side profile or a cross-sectional profile of at least a portion of nozzle segment 10.

In one embodiment, the system includes a dial gauge (not shown). Any suitable dial gauge known to those skilled in the art and guided by the teachings herein provided may be used with the system. The dial gauge measures a nominal dimension of a machined feature on setting plate 190 and a corresponding machined feature dimension on nozzle segment 10. The measured feature dimension is compared to the nominal dimension to calculate a dimensional variance for the nozzle segment feature. The system may also include a sliding parallel for measuring a distance between a surface of a pedestal stand, such as a plate surface, and a corresponding side edge of outer wall 12 or a corresponding side edge of inner wall 22, for example.

The above-described method, apparatus and/or system enables the machined features of turbine engine components to be inspected and measured in a cost-effective and timely manner. More specifically, the method, apparatus and system tool enables the machined features of turbine engine components to be measured simply and without training. As a result, turbine engine components can be reliably and efficiently inspected and measured, thereby increasing productivity and decreasing repair time.

Exemplary embodiments of a method, an apparatus and a system for inspecting machined features of turbine engine components, such as a nozzle segment, are described above in detail. The method, apparatus and system are not limited to the specific embodiments described herein, but rather, steps of the method and/or elements or components of the apparatus and system may be utilized independently and separately from others described herein. Further, the described method steps and/or apparatus and system elements or components can also be defined in, or used in combination with, other methods, apparatus and/or systems and are not limited to practice with only as described herein.

While the invention has been described in terms of various specific embodiments, those skilled in the art will recognize that the invention can be practiced with modification within the spirit and scope of the claims.

What is claimed is:

1. A tool for inspecting a turbine nozzle segment, the turbine nozzle segment comprising an outer wall having an axial length extending between an outer forward face and an outer aft face, and an opposing inner wall having an axial length extending between an inner forward face and an inner aft face, a leading edge defined between the outer forward face and the inner forward face and a trailing edge defined between the outer aft face and the inner aft face, the tool comprising:

a base having an outer rail corresponding to an outer surface of the outer wall, the outer rail concentric with an axis of a turbine engine shaft, and an inner rail parallel with an inner surface of the inner wall;

a first pedestal connected to the base and including an outer stand and a cooperating inner stand, each of the outer stand and the inner stand including at least one plate, wherein a first side edge of the turbine nozzle segment is positioned with respect to each of the outer stand and the inner stand; and a second pedestal connected to the base and including an outer stand and a cooperating inner stand, each of the outer stand and the inner stand including at least one plate, wherein an opposing second side edge of the turbine nozzle segment is positioned with respect to each of the outer stand and the inner stand, the outer wall is positioned between the outer stand of the first pedestal and the outer stand of the second pedestal and the inner wall is positioned between the inner stand of the first pedestal and the inner stand of the second pedestal.

2. The tool of claim 1 wherein each of the first pedestal and the second pedestal further comprises:
   an upper plate and a lower plate connected to the outer stand, each of the upper plate and the lower plate forming at least one void cooperating with one pin of a plurality of pins to measure at least one of a position, a depth and a width of at least a portion of a seal slot formed in a side edge of the turbine nozzle segment; and
   an upper plate and a lower plate connected to the inner stand, each of the upper plate and the lower plate forming at least one void cooperating with a pin of a plurality of pins to measure at least one of a position, a depth and a width of at least a portion of a seal slot formed in the side edge.

3. The tool of claim 1 further comprising at least one axial locator interfering with one of the outer wall and the inner wall and positioning the turbine nozzle segment in an axial direction with respect to the base.

4. The tool of claim 1 further comprising at least one tooling ball positioning the turbine nozzle segment in a radial direction with respect to the base.

5. The tool of claim 1 further comprising an anti-rotational ball preventing rotational movement of the turbine nozzle segment with respect to the base.

6. A system for inspecting a turbine nozzle segment, the turbine nozzle segment comprising an outer wall having an axial length extending between an outer forward face and an outer aft face, and an opposing inner wall having an axial length extending between an inner forward face and an inner aft face, a leading edge defined between the outer forward face and the inner forward face and a trailing edge defined between the outer aft face and the inner aft face, the system comprising:
   a tool comprising:
      a base having an outer rail corresponding to an outer surface of the outer wall, the outer rail concentric with an axis of a turbine shaft, and an inner rail parallel with an inner surface of the inner wall;
      a first pedestal connected to the base, the first pedestal including an outer stand and an inner stand, wherein a forward section of a first side edge of the turbine nozzle segment is positioned with respect to the inner stand and an aft section of the first side edge is positioned with respect to the outer stand, each of the outer stand and the inner stand including a plate forming at least one void;
      a second pedestal connected to the base, the second pedestal including an outer stand and an inner stand, wherein a forward section of a second side edge of the turbine nozzle segment is positioned with respect to the inner stand and an aft section of the second side edge is positioned with respect to the outer stand, each of the outer stand and the inner stand including a plate forming at least one void;
      a plurality of pins, each positionable within a corresponding void of the at least one void formed in the plate, and cooperating with the corresponding void to measure at least one of a position, a depth and a width of at least a portion of at least one seal slot formed in one of the first side edge and the second side edge; and
      a setting plate connected to the first pedestal and corresponding to one of a side profile and a cross-sectional profile of at least a portion of the turbine nozzle segment.

7. The system of claim 6 wherein each pin of the plurality of pins includes a first measuring section having a 0.005 inch tolerance, a second measuring section having a 0.020 inch tolerance, and a third measuring section having a 0.030 inch tolerance.

8. The system of claim 6 further comprising a dial gauge, the dial gauge measuring a dimension on the turbine nozzle segment and a corresponding nominal dimension on the setting plate, the measured dimension compared to the nominal dimension to calculate a dimensional variance of the turbine nozzle segment.

9. The system of claim 6 further comprising a sliding parallel measuring a distance between a surface of a pedestal stand and one of the first side edge and the second side edge.

* * * * *

UNITED STATES PATENT AND TRADEMARK OFFICE
CERTIFICATE OF CORRECTION

PATENT NO. : 7,578,164 B2  
APPLICATION NO. : 11/232625  
DATED : August 25, 2009  
INVENTOR(S) : Sherlock et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Seventh Day of September, 2010

David J. Kappos  
*Director of the United States Patent and Trademark Office*